United States Patent
Fioroni et al.

(10) Patent No.: US 9,957,597 B2
(45) Date of Patent: May 1, 2018

(54) METHOD FOR PREPARING A SURFACE BEFORE THERMAL SPRAY-COATING

(71) Applicant: Comau France, Trappes (FR)

(72) Inventors: Claude Fioroni, Castres (FR); Vincent Bousquet, Castres (FR); Frederic Gea, Labruguiere (FR); Sandrine Sereni, Saix (FR)

(73) Assignee: COMAU FRANCE, Trappes (FR)

( * ) Notice: Subject to any disclaimer, the term of this patent is extended or adjusted under 35 U.S.C. 154(b) by 0 days. days.

(21) Appl. No.: 15/107,402

(22) PCT Filed: Feb. 3, 2015

(86) PCT No.: PCT/FR2015/050237
§ 371 (c)(1),
(2) Date: Jun. 22, 2016

(87) PCT Pub. No.: WO2015/124841
PCT Pub. Date: Aug. 27, 2015

(65) Prior Publication Data
US 2016/0319416 A1    Nov. 3, 2016

(30) Foreign Application Priority Data

Feb. 18, 2014   (FR) ...................................... 14 51299

(51) Int. Cl.
*C23C 4/02* (2006.01)
*B23P 9/02* (2006.01)
(Continued)

(52) U.S. Cl.
CPC ................. *C23C 4/02* (2013.01); *B23C 3/32* (2013.01); *B23P 9/02* (2013.01); *C23C 4/134* (2016.01);
(Continued)

(58) Field of Classification Search
CPC ......... B23C 3/32; B23C 3/34; B23C 2270/06; B23C 2220/36; B23C 2220/68;
(Continued)

(56) References Cited

U.S. PATENT DOCUMENTS 3,359,581 A * 12/1967 Senediak ................. B23G 7/00
                                                            408/1 R
4,831,674 A *  5/1989 Bergstrom ............... B23G 1/34
                                                            408/222
(Continued)

FOREIGN PATENT DOCUMENTS

| EP | 2505300 A1 | 10/2012 |
| FR | 2972373 A1 | 9/2012 |
| FR | 2973810 A1 | 10/2012 |
| WO | 2006/061710 A1 | 6/2006 |

*Primary Examiner* — Daniel Howell
*Assistant Examiner* — Yasir Diab
(74) *Attorney, Agent, or Firm* — Paul & Paul

(57) ABSTRACT

The invention relates to a method for preparing the surface of a substrate (100) for the purpose of accepting and holding a coating sprayed by a plasma torch. Said method includes a machining phase and is characterized that it includes the following phases: producing, by means of a machining tool (200), at least one groove having at least one angled edge; offsetting the tool (200) by moving the tool relative to the surface of the substrate (100) in a direction perpendicular to the longitudinal axis of the groove and along a path shorter than the projected length of the angled edge; and using said tool (200) on the angled edge of the groove such as to subject said edge to stress and create another offset groove, and so on and so forth, such that the tool (200) irreversibly changes the shape of the ribs (111, 112, 113, 114) finally obtained between each groove, and said ribs adopt undercut surfaces.

7 Claims, 8 Drawing Sheets

(51) Int. Cl.
*B23C 3/32* (2006.01)
*C23C 4/134* (2016.01)
*B23C 3/02* (2006.01)

(52) U.S. Cl.
CPC ............ *B23C 3/02* (2013.01); *B23C 2220/36* (2013.01); *B23C 2220/52* (2013.01); *B23C 2220/68* (2013.01); *B23C 2270/06* (2013.01); *Y10T 409/300112* (2015.01)

(58) Field of Classification Search
CPC ............ B23C 2220/52; Y10T 29/5176; Y10T 409/307112; Y10T 409/307616; Y10T 409/30756; Y10T 409/300056; Y10T 409/300112; Y10T 409/30028; Y10T 409/300336; Y10T 409/300392; Y10T 409/30056; Y10T 409/300616; Y10T 409/300672; Y10T 409/300728; Y10T 409/300784; Y10T 409/303752; Y10T 409/303808
See application file for complete search history.

(56) References Cited

U.S. PATENT DOCUMENTS

| | | | | |
|---|---|---|---|---|
| 5,080,538 | A * | 1/1992 | Schmitt | B23G 5/184 409/66 |
| 2003/0010201 | A1* | 1/2003 | Takahashi | C23C 4/02 92/169.1 |
| 2005/0044707 | A1* | 3/2005 | Izquierdo | C23C 4/02 29/888.061 |
| 2010/0101526 | A1 | 4/2010 | Schaefer | |
| 2010/0209204 | A1* | 8/2010 | Wissling | B23G 7/00 408/1 R |
| 2010/0326270 | A1* | 12/2010 | Doerfler | B23P 9/00 92/169.1 |
| 2011/0297118 | A1* | 12/2011 | Izawa | C23C 4/12 123/193.5 |
| 2012/0317790 | A1* | 12/2012 | Flores | B23P 9/02 29/558 |
| 2013/0284140 | A1* | 10/2013 | Schramm | C23C 4/02 123/193.2 |
| 2014/0004255 | A1* | 1/2014 | Whitbeck | B05D 1/02 427/8 |

* cited by examiner

METHOD FOR PREPARING A SURFACE BEFORE THERMAL SPRAY-COATING

CROSS-REFERENCE TO RELATED APPLICATION

This application is a 371 national stage application of International Application PCT/FR2015/050237, filed Feb. 3, 2015, and claims the priority of French Application No. 1451299, filed on Feb. 18, 2014.

FIELD OF APPLICATION OF THE INVENTION

This invention relates to the field of depositing material by means of a thermal spray-coating and in particular to the adaptations that make it possible to prepare the surface accepting said material in the best conditions.

DESCRIPTION OF PRIOR ART

Depositing via thermal spray-coating and in particular via a plasma torch of metal coating onto a surface is a surface method conventionally used in repairing used mechanical parts.

It is also used advantageously for the localized coating of complex parts where particular conditions for use are required. This is the case for example for the coating of cylinders of casings of automobile engines. Indeed, these casings tend to be manufactured from a light material such as aluminum but the cylinders must have superior characteristics in terms of friction and resistance to wear and tear.

While a first solution consists in molding the aluminum casings around cast-iron cylinders such as molding inserts, another solution consists in depositing via a plasma torch a steel to be used as a coating for the cylinders. Compared to the first solution, depositing a material via a plasma torch has the advantage of proposing for the cylinders a finer coating with better thermal conductivity. In addition, the coating created is porous which allows for better lubrication, which contributes in improving the output of the motor.

However, the attaching of these materials in this example, can be obtained only mechanically. Implementing such a method as such requires the production of a surface on the substrate to be coated that is able to retain, by mechanical blocking after cooling, the layer of metal sprayed in quasi-liquid state. Grooves that propose undercut surfaces are conventionally produced.

Until today, the producing of such a surface required the use of a complex tool able to form, by removing material, a grooved surface with a complex adapted groove profile. The costs for designing and using such a special tool and its dedicated working method result in that the method for coating via a plasma torch in the end is used only for small series.

DESCRIPTION OF THE INVENTION

Starting from this state, the applicant carried out research aimed at allowing for a less expensive operation of a method for depositing a coating via a plasma torch by proposing a method for preparing the accepting surface by means of a less expensive machine operation able to be carried out by a standard tool.

According to the invention, the method for preparing the surface of a substrate for the purpose of accepting and holding a coating sprayed by a plasma torch, said method being of the type of the one comprising a machining phase, is remarkable in that it comprises the following phases:
  producing, by means of a machining tool at least one groove having at least one angled edge,
  offsetting the tool, by moving the tool relative to the surface of the substrate, in a direction perpendicular to the longitudinal axis of the groove and along a path shorter than the projected length of the angled edge,
  using said tool on the angled edge of the groove in such a way as to subject this edge to stress and create another offset groove, and so on and so forth in such a way that the tool irreversibly changes the shape of the ribs finally obtained between each groove, and said ribs adopt undercut surfaces.

It appears indeed that by using in an original manner the cutting edges of a tool by having it form via removal of material and deforming via plastic deformation a groove by passing again therein, it is possible to obtain deformations of material that form grooves that adopt a profile with undercut surfaces.

The creation of undercut surfaces without using a tool of a particular expensive form facilitates the required preparation of the substrate. A method consisting in the succession of such operations therefore has new technical effects.

According to another characteristic of the invention, the tool is preferably a milling tool set into rotation with respect to the part.

According to another characteristic of the invention, the tool is preferably a tool with a plurality of cutting edges adopting a substantially triangular profile.

According to another characteristic of the invention, the tool is preferably a comb threading tool. The novel use of a known tool facilitates the implementation of the method of the invention and contributes to the objectives of the invention. In addition, the deformations observed on the ribs obtained on the surface of the substrate have the form of wavelets. The deformed rib partially covers the adjacent groove with a distal end returning to the bottom of the groove. Indeed, via successive passes of the comb, the ribs or the grooves that separate them end up by bending (at their top) and tend towards the adjacent rib or groove.

Such a profile performs particularly well for both accepting the quasi-liquid metal but also for mechanically blocking the coating formed.

According to another characteristic of the invention, the tool follows a path by helical interpolation by means of a numerical-controlled machine tool. Indeed, the grooves can be carried out as well according to a succession of parallel trajectories or according to a progression synchronizing the rotation of the tool and the advancing of the latter.

According to a preferred embodiment of the invention, the comb tool produces successive machinings according to a pitch corresponding to a division of the pitch for which it is preformed. Preferably, the comb tool produces successive machinings according to a pitch that corresponds to a division by 4 of the pitch for which it is preformed.

According to a preferred but not limiting embodiment, the substrate is constituted by the inside surface of bores made in a molded aluminum casing for the purposes of constituting cylinders and the coating sprayed by a plasma torch is steel.

With the fundamental concepts of the invention having been disclosed hereinabove in their most elementary form, other details and characteristics shall result more clearly when reading the following description and with regards to the annexed drawings, giving by way of a non-limiting example, an embodiment of a method in accordance with the invention.

EMBODIMENT DESCRIPTION

Figure 1:
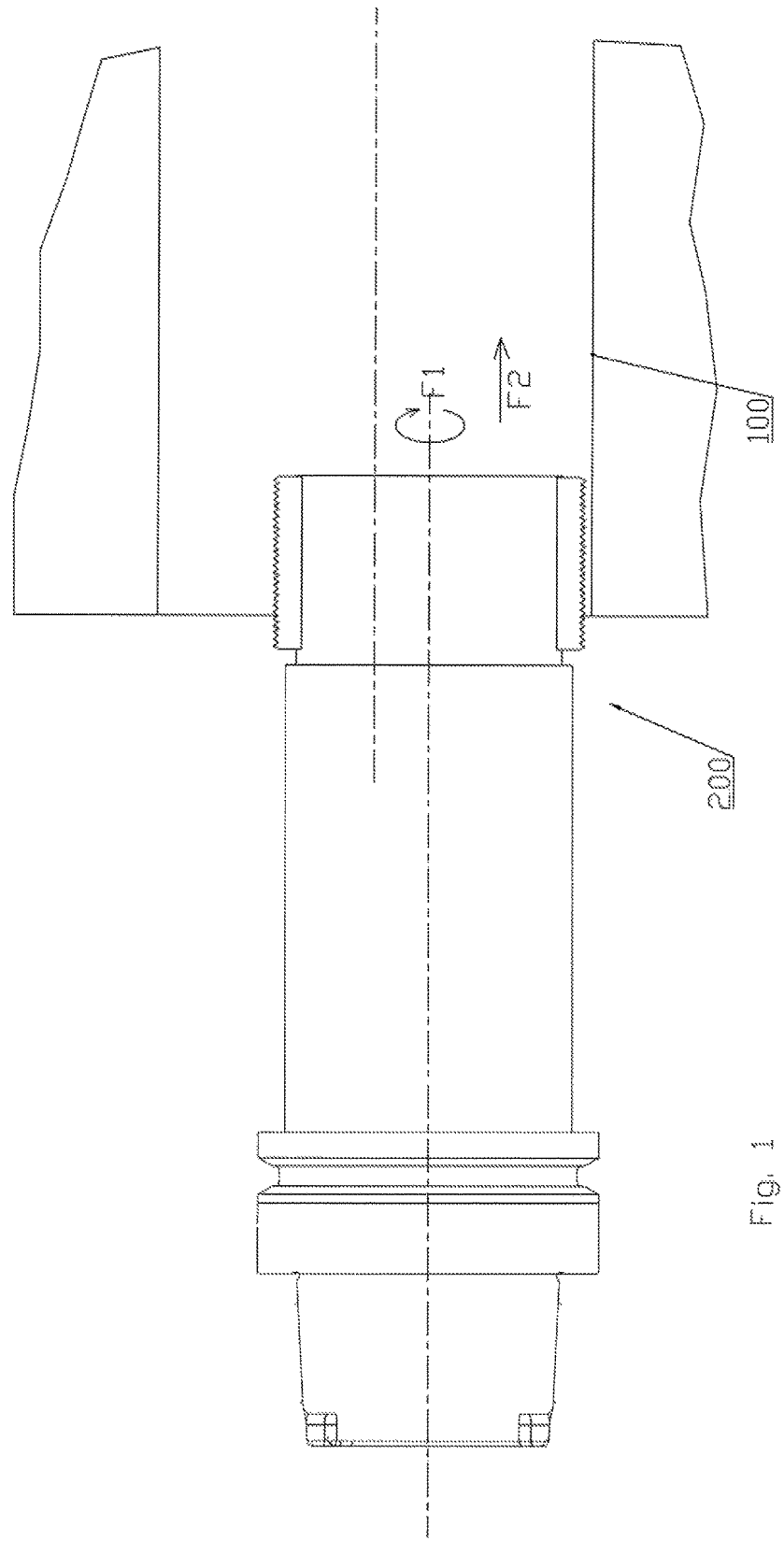
FIG. 1 is a diagrammatical drawing of a comb threading tool that is to be applied on the surface of a bore that is to receive a coating via plasma projection.

As shown in the drawing in FIG. 1, the method for preparing the surface of the bore 100 for the purpose of accepting and holding a metal coating is implemented by a comb tool 200 driven in rotation according to the arrow F1 and which will come into contact with the surface of the bore 100 according to a first position then be successively axially offset according to the arrow F2 and return to contact with the bore in accordance with the invention.

The succession of FIGS. 2 to 8 shows the detail of the succession of the machinings of 5 triangular shapes 210, 220, 230, 240, 250 constituting a portion of the cutting edges of the tool 200.

Figure 2:
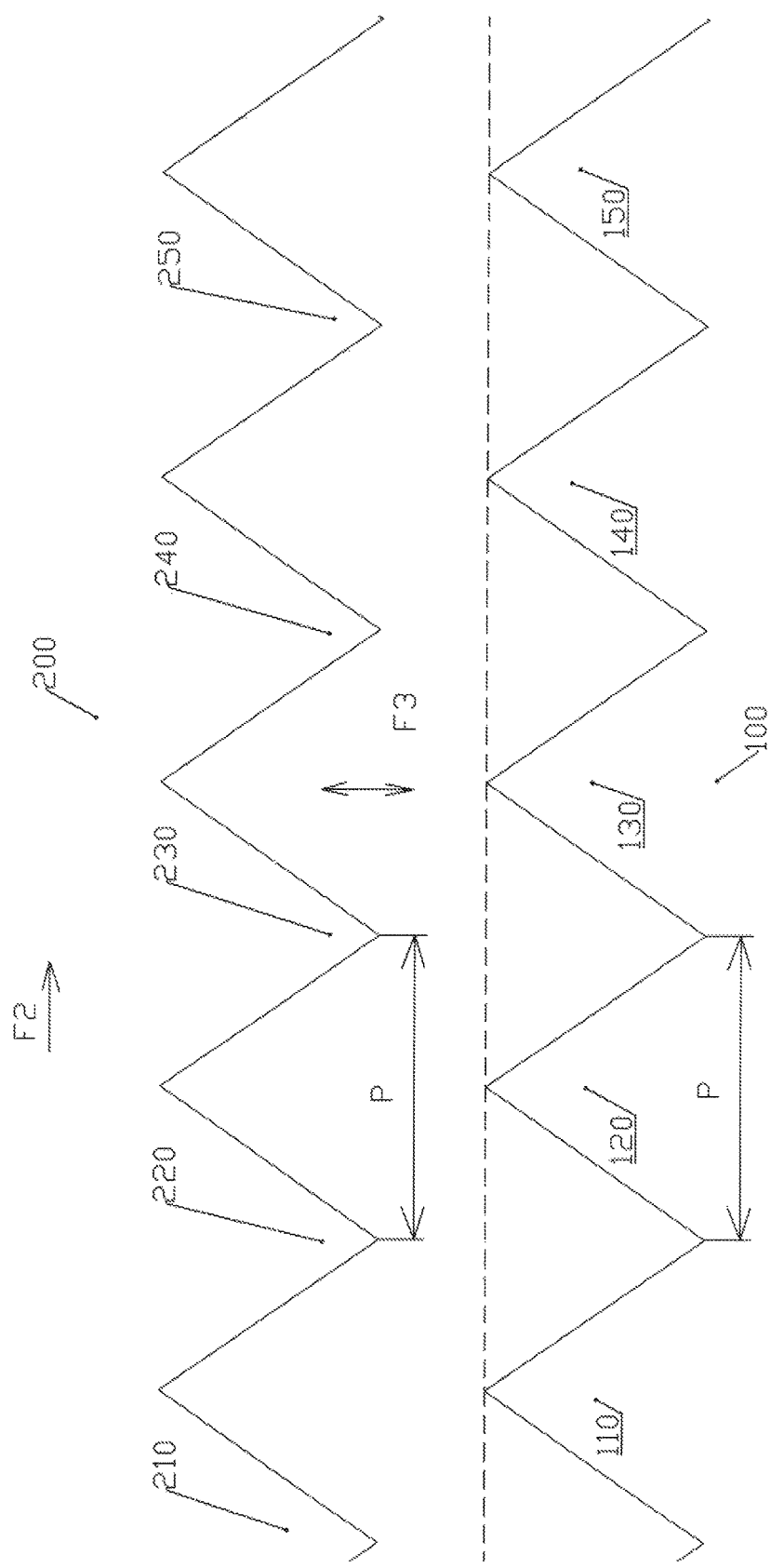
FIG. 2 is a diagrammatical drawing of a detailed cross-section view of the tool and of the machining carried out on the surface of the bore by the tool.

As shown in the drawing in FIG. 2, in accordance with conventional machining, the machining path of the tool in rotation 200, path shown by the double-arrow F3, conducted the shapes 210, 220, 230, 240 and 250 to the production by removal of material of grooves and of complementary ribs 110, 120, 130, 140, 150 with a substantially identical profile and according to a pitch P corresponding to the pitch P defined by the shapes of the tool.

Figure 3:
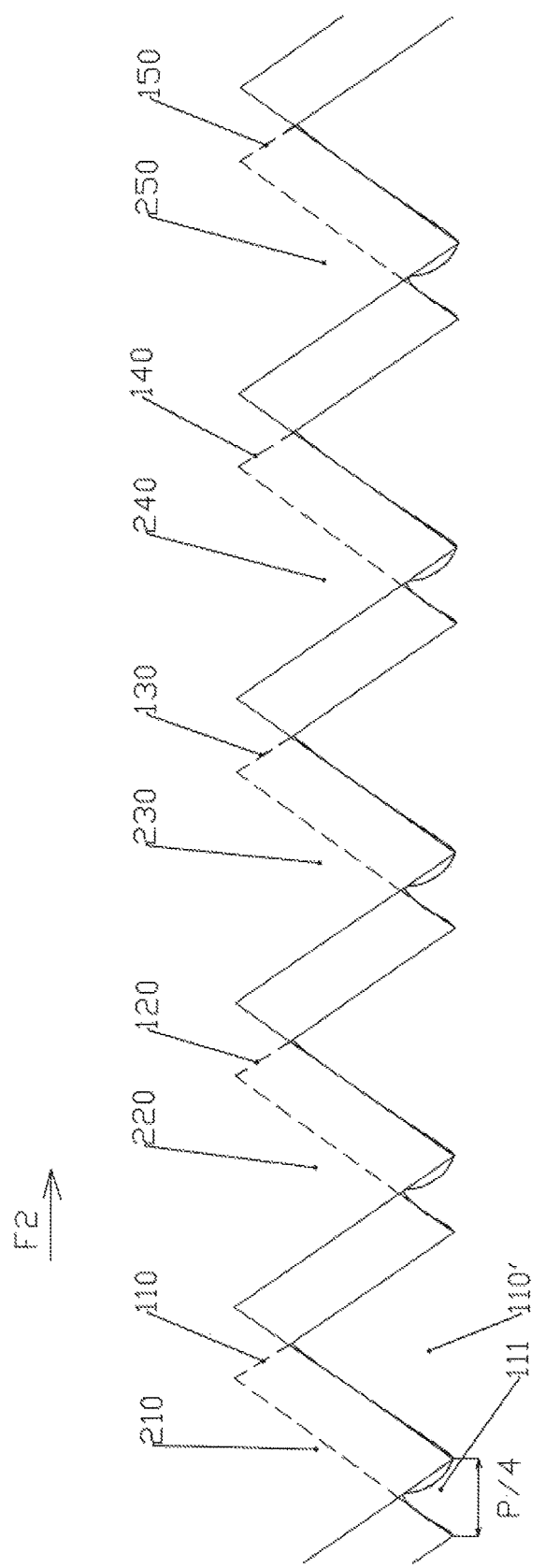
FIG. 3 is a diagrammatical cross-section drawing of the tool during machining according to a first offset of the tool.

As shown in the drawing in FIG. 3, an offset corresponding to a quarter of the pitch P and an equivalent machining path drive the shapes 210, 220, 230, 240, 250 to machine the bore by coming into contact with the latter on the angled surfaces of the ribs 110, 120, 130, 140, 150 already produced by creating two smaller ribs. In accordance with the invention, this offset constitutes a path shorter than the projected length of the angled edge of the groove, with the principle being to return to create a machining on the angled surface that has just been produced.

Taking the example of rib 110, for each first rib machined, a smaller rib 111 and a larger rib 110' result from this new machining.

Figure 4:
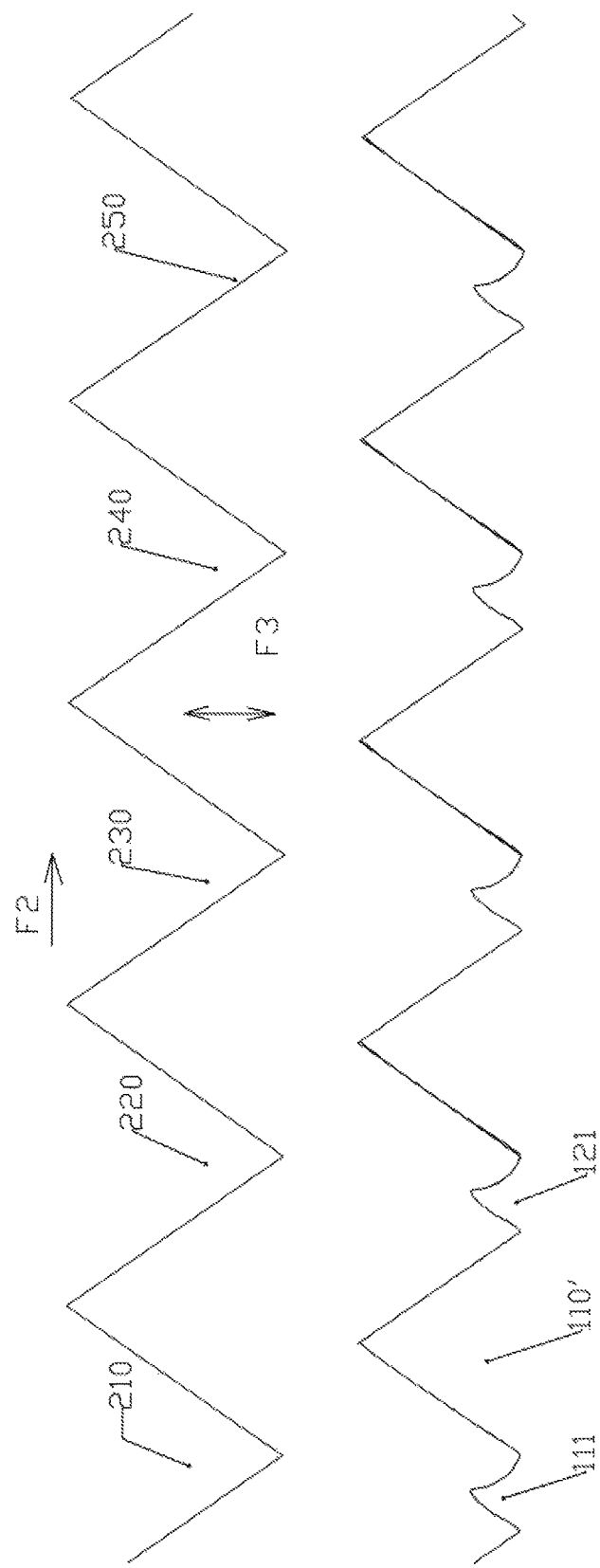
FIG. 4 is a diagrammatical detailed cross-section drawing of the tool and of the machining carried out according to the first offset.

As shown in the drawings in FIGS. 3 and 4, the stress exerted during machining by the triangular shape 210 on the angled machined plane in the preceding cutting machining 200 and the reduction of the foot of the rib lead to the plastic deformation of the two ribs 111, 110' created. The deformation of the small rib 111 is greater than the deformation of the larger rib 110' and has undercut surfaces. The same applies to all of the ribs.

Figure 5:
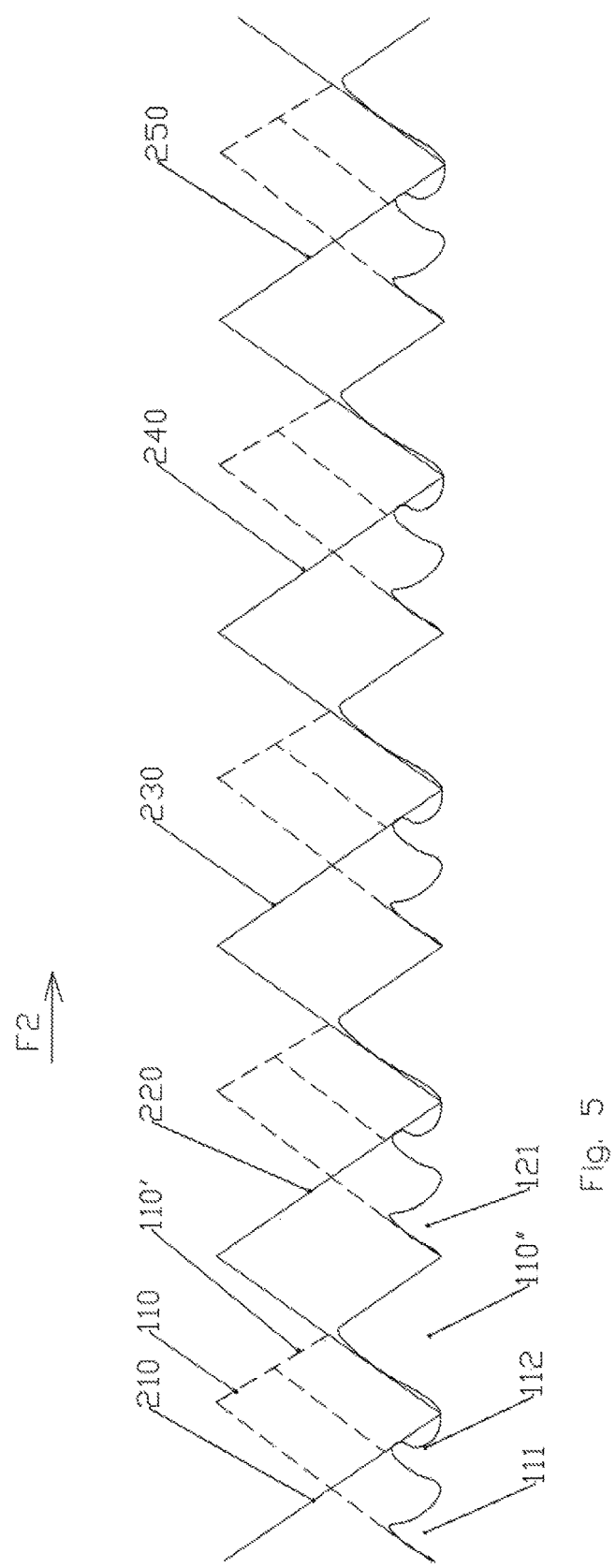
FIG. 5 is a diagrammatical cross-section drawing of the tool during machining according to a second offset of the tool.
Figure 6:
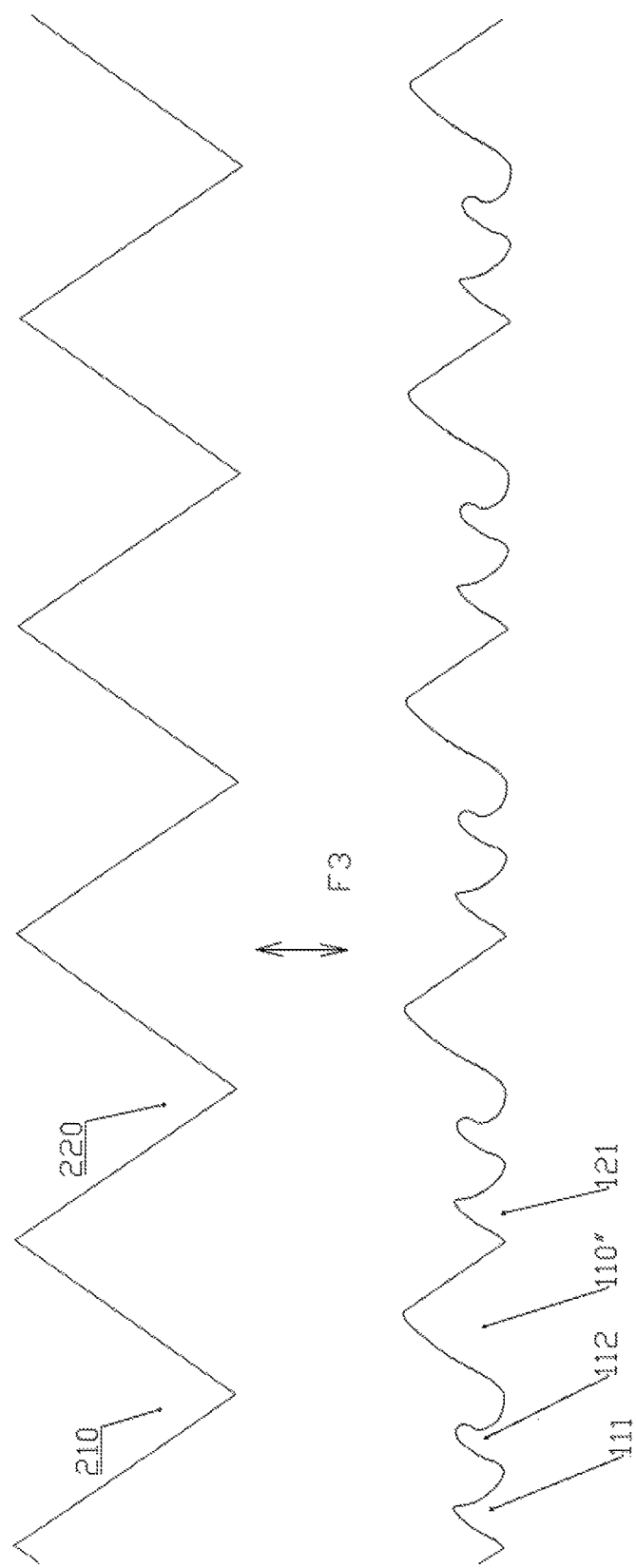
FIG. 6 is a diagrammatical detailed cross-section drawing of the tool and of the machining carried out according to the second offset.

As shown in the drawings in FIGS. 5 and 6, an equivalent additional offset and a machining path lead to the machining of the rib 110' and to the creation of:

a second small rib 112 with a size substantially equivalent to the first small rib 111 but with a more pronounced deformation due to the deformation of the rib 110' in the preceding machining, a third larger rib 110" which itself has been subject to a deformation.

Figure 7:
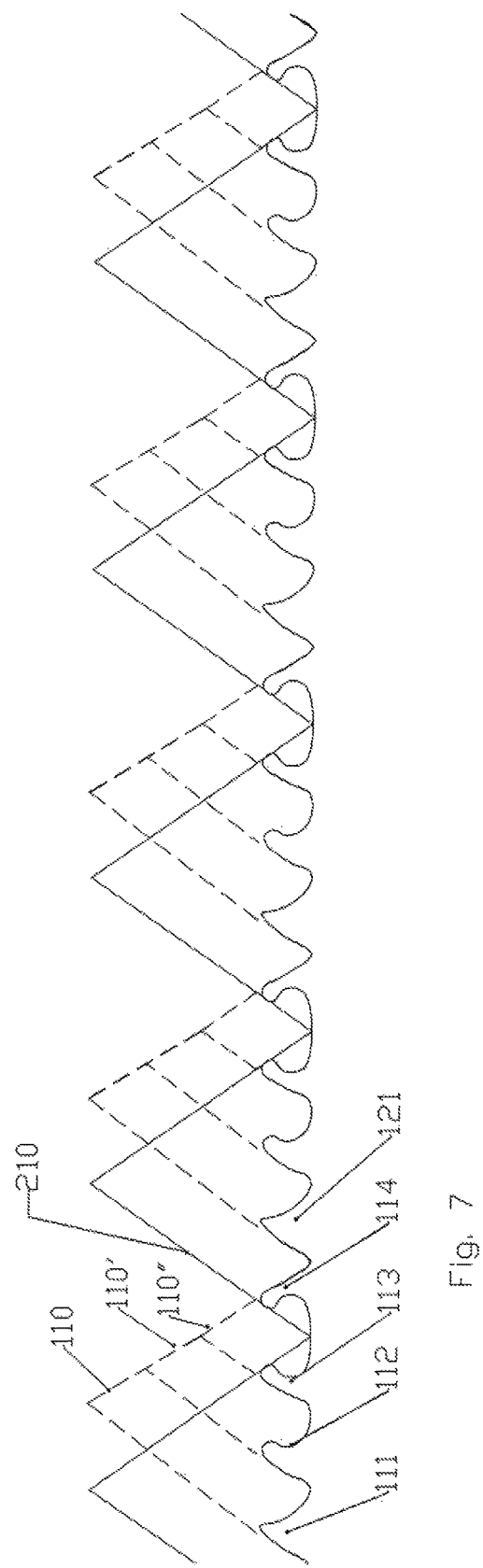
FIG. 7 is a diagrammatical cross-section drawing of the tool during machining according to a third offset of the tool.
Figure 8:
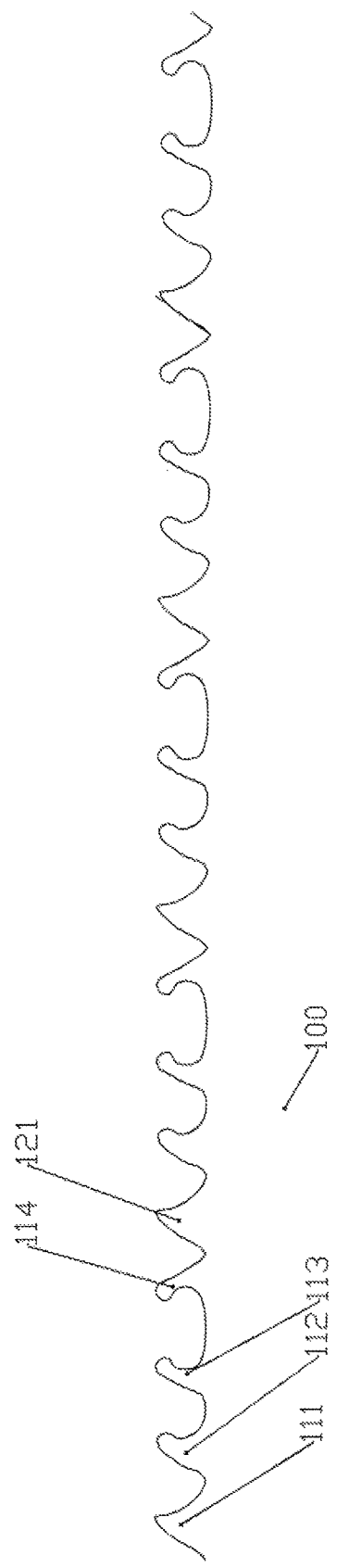
FIG. 8 is a diagrammatical detailed cross-section drawing of the tool and of the machining carried out according to the third offset.

Finally, as shown in the drawings in FIGS. 7 and 8, an equivalent additional offset and machining path lead to the machining of the rib 110" and to the creation of:

additional smaller ribs 113 and 114 with a size substantially equivalent to the first two 111 and 112 but with a more pronounced deformation in particular for the fourth 114 due to the deformation of the rib 110" but also the creation of the rib 211 in the vicinity.

As such, unexpectedly, it appears that the succession of machinings produced in these conditions does not provoke the true reproduction of an under-dimensioned version of the profiles of the shapes of the cutting tool but the deformation of the profiles and the creation of undercut shapes allowing for the accepting and the mechanical blocking sought for a coating via thermal spray-coating. According to a test, this deformation was observed on a surface of a molded aluminum substrate.

It is understood that the method, which has just been described and shown hereinabove, was described and shown as a disclosure rather than as a limitation. Of course, various arrangements, modifications and improvements can be made to the example hereinabove, without however leaving the scope of the invention.

The invention claimed is:

1. Method for preparing the surface of a substrate (100) for the purpose of accepting and holding a coating sprayed by a plasma torch, said method being of the type of the one comprising a machining phase, CHARACTERIZED IN THAT it comprises the following phases:

producing, by means of a machine tool (200) at least one groove with at least one angled edge, offsetting the tool (200), by moving the tool relative to the surface of the substrate (100), according to a direction perpendicular to the longitudinal axis of the groove and along a path shorter than the projected length of the angled edge, using said tool (200) on the angled edge of the groove in such a way as to subject this edge to stress and create another offset groove and so on and so forth such that the ribs (111, 112, 113, 114) finally obtained between each groove are irreversibly deformed under the action of the tool (200) and adopt undercut surfaces.

2. Method according to claim 1, CHARACTERIZED IN THAT the tool (200) is a milling tool set into rotation with respect to the part.

3. Method according to claim 1, CHARACTERIZED IN THAT the tool (200) is a milling tool having a plurality of cutting edges adopting a substantially triangular profile.

4. Method according to claim 2, CHARACTERIZED IN THAT the tool (200) is a comb threading tool.

5. Method according to claim 2, CHARACTERIZED IN THAT the tool (200) follows a path by helical interpolation by means of a numerical-controlled machine tool.

6. Method according to claim 4, CHARACTERIZED IN THAT the comb tool (200) produces successive machinings according to a pitch corresponding to a division of the pitch for which it is preformed.

7. Method according to claim 6, CHARACTERIZED IN THAT the comb tool (200) produces successive machinings according to a pitch corresponding to a division by 4 of the pitch for which it is preformed.

\* \* \* \* \*